(12) United States Patent
Martin

(10) Patent No.: US 8,667,094 B2
(45) Date of Patent: *Mar. 4, 2014

(54) METHOD, SYSTEM AND APPARATUS FOR DELIVERING WEB CONTENT

(75) Inventor: Dary Joseph Martin, Kitchener (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/617,450

(22) Filed: Sep. 14, 2012

(65) Prior Publication Data

US 2013/0013724 A1 Jan. 10, 2013

Related U.S. Application Data

(63) Continuation of application No. 12/704,642, filed on Feb. 12, 2010, now Pat. No. 8,326,947.

(51) Int. Cl.
*G06F 15/16* (2006.01)
(52) U.S. Cl.
USPC ............................................. 709/219
(58) Field of Classification Search
None
See application file for complete search history.

(56) References Cited

U.S. PATENT DOCUMENTS

| 7,082,476 | B1* | 7/2006 | Cohen et al. | 709/246 |
| 7,970,940 | B1* | 6/2011 | van de Ven et al. | 709/245 |
| 8,028,091 | B1* | 9/2011 | Kleinfelter et al. | 709/245 |
| 8,280,946 | B1* | 10/2012 | Badros | 709/203 |
| 2010/0088398 | A1* | 4/2010 | Plamondon | 709/220 |
| 2010/0241740 | A1* | 9/2010 | Henrich | 709/222 |

OTHER PUBLICATIONS

Parent U.S. Appl. No. 12/704,642, filed Feb. 12, 2010; Title: Method, System and Apparatus for Delivering Web Content.

* cited by examiner

*Primary Examiner* — Shirley Zhang
(74) *Attorney, Agent, or Firm* — Perry + Currier Inc.

(57) ABSTRACT

According to embodiments described in the specification, a method, system and apparatus for delivering web content are provided. The method comprises maintaining a web page in a memory of a web server identifiable by a network address, the web page including at least one reference to a foreign element maintained at a second web server identifiable by a second network address; identifying the at least one reference; transmitting a request from an interface of the web server for obtaining the second network address; receiving the second network address of the second web server and storing the second network address in the memory in association with an identifier of the web page.

20 Claims, 5 Drawing Sheets

METHOD, SYSTEM AND APPARATUS FOR DELIVERING WEB CONTENT

CROSS REFERENCE TO RELATED APPLICATION

This application is a continuation of earlier non-provisional application having application Ser. No. 12/704,642 filed Feb. 12, 2010 now U.S. Pat. No. 8,326,947, granted on Dec. 4, 2012. The disclosure of aforementioned application Ser. No. 12/704,642 is hereby incorporated by reference in its entirety.

FIELD

The specification relates generally to the delivery of web content, and specifically to a method, system and apparatus for delivering web content.

BACKGROUND

Mobile electronic devices such as cellular telephones are increasingly used for data services, including the viewing of web pages. Despite their rapidly improving capabilities, computational power, memory and network bandwidth continue to be limiting resources for such devices. In the case of web surfing, it is often necessary to transmit multiple requests to various entities in order to view a given web page.

For example, viewing a web page may require the device to download data from several different servers. This requires the device not only to contact each of those servers, but also to determine how to contact the servers in the first place. These activities consume valuable device resources, and can result in delays and performance degradation.

BRIEF DESCRIPTIONS OF THE DRAWINGS

Embodiments are described with reference to the following figures, in which.

DETAILED DESCRIPTION

Figure 1:
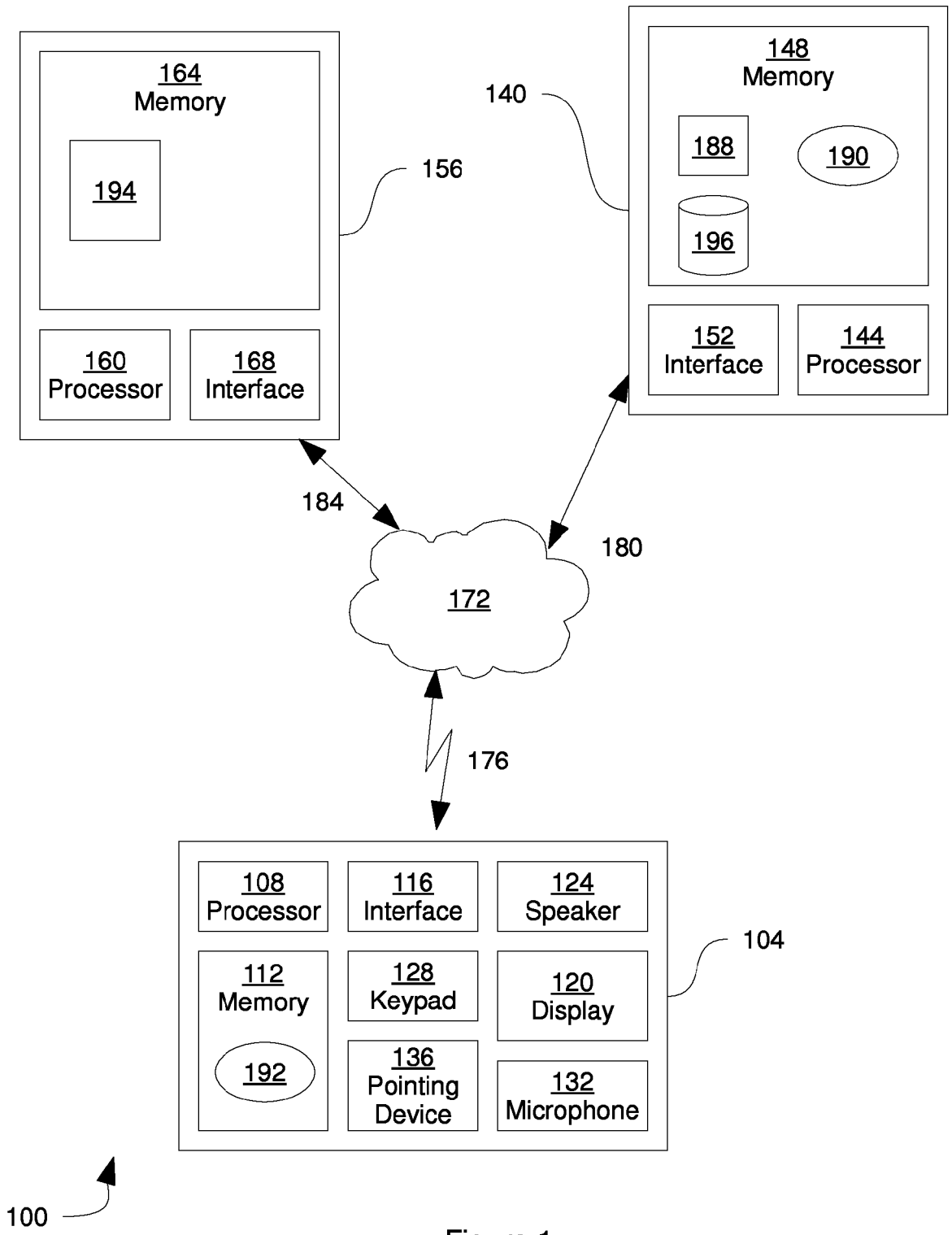
FIG. 1 depicts a system for delivering web content, according to a non-limiting embodiment.

According to an aspect of the specification, a method for delivering web content is provided. The method comprises maintaining a web page in a memory of a web server identifiable by a network address, the web page including at least one reference to a foreign element maintained at a second web server identifiable by a second network address; identifying the at least one reference; transmitting a request from an interface of the web server for obtaining the second network address; receiving the second network address of the second web server and storing the second network address in the memory in association with an identifier of the web page.

According to a second aspect of the specification, a web server is provided. The web server comprises an interface for receiving and transmitting requests; a memory for maintaining a web page identifiable by a network address, the web page including at least one reference to a foreign element maintained at a second web server identifiable by a second network address; a processor interconnected with the interface and the memory, the processor configured to identify the at least one reference; the processor further configured to transmit a request via the interface for obtaining the second network address; the processor further configured to receive the second network address of the second web server for storage in the memory in association with an identifier of the web page.

According to a third aspect of the specification, a method for delivering web content is provided. The method comprises transmitting a request for a web page from an interface of a mobile electronic device to a web server, the web page including at least one reference to a foreign element maintained at a second web server identifiable by a name and a corresponding network address; receiving the web page and a first network address from the web server at the interface; transmitting a first request for the foreign element using the first network address; transmitting a second request to a Domain Name System ("DNS") server for a second network address corresponding to the name of the second web server from the interface; responsive to receiving the second network address, determining whether the first and second network addresses match; and, when the first and second network addresses do not match, discarding the first network address.

According to a fourth aspect of the specification, a mobile electronic device is provided comprising: an interface for receiving and transmitting requests; a memory; and, a processor interconnected with the interface and the memory, the processor configured to transmit a request for a web page via the interface to a web server, the web page including at least one reference to a foreign element maintained at a second web server identifiable by a name and a corresponding network address; the processor further configured to receive the web page and a first network address for storage in the memory; the processor further configured to transmit a first request for the foreign element using the first network address; the processor further configured to transmit a second request to a Domain Name System ("DNS") server for a second network address corresponding to the name of the second web server from the interface; the processor further configured, responsive to receiving the second network address, to determine whether the first and second network addresses match; and, when the first and second network addresses do not match, to discard the first network address.

According to other aspects of the specification, computer readable storage media are provided for storing computer readable instructions for execution by a processor, the computer readable instructions implementing the above methods.

FIG. 1 depicts a communications system 100 for delivering web content. System 100 includes a mobile electronic device 104, which in the present embodiment is based on the computing environment and functionality of a hand-held wireless communication device. It will be understood, however, that mobile electronic device 104 is not limited to a hand-held wireless communication device. Other mobile electronic devices are possible, such as cellular telephones, smart telephones, Personal Digital Assistants ("PDAs"), media or MP3 players, laptop computers and the like. Mobile electronic device 104 includes a processor 108 and a memory 112. Memory 112 can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory.

Mobile electronic device 104 also includes a communications interface 116 and one or more output devices such as a display 120 and a speaker 124. Mobile electronic device 104 further includes one or more input devices configured to receive input data such as a keypad 128, a microphone 132 and a pointing device 136. Pointing device 136 can include, for example, a touch screen integrated with display 120, a scroll wheel and the like. The various components of mobile electronic device 104 are interconnected, for example via a communication bus (not shown). Mobile electronic device 104 can be powered by a battery (not shown).

System 100 also includes a web server 140, which can be based on any well-known server environment. As such, web server 140 includes a processor 144 and a memory 148 which can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory. Web server 140 also includes a communications interface 152. Web server 140 can be managed by way of input and output devices (not shown) such as a keyboard and display. Such input and output devices can be co-located with web server 140 or can be located at a terminal (not shown) remote from web server 140.

System 100 further includes a Domain Name System ("DNS") server 156. As with web server 140, DNS server 156 can be based on any well-known server environment. It will be understood that DNS server 156 need not be based on the same server environment as web server 140. DNS server 156 includes a processor 160, a memory 164 which can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory and a communications interface 168.

Mobile electronic device 104, web server 140 and DNS server 156 are interconnected by a network 172 via respective links 176, 180 and 184. Network 172 can include any suitable combination of wired and/or wireless networks, including but not limited to a Wide Area Network ("WAN") such as the Internet, a Local Area Network ("LAN"), cell phone networks, WiFi networks, WiMax networks and the like. Links 176, 180 and 184 are compatible with network 172. In particular, link 176 can be a wireless link based on Global System for Mobile communications ("GSM"), General Packet Radio Service ("GPRS"), Enhanced Data rates for GSM Evolution ("EDGE"), and the third-generation mobile communication system (3G), Institute of Electrical and Electronic Engineers ("IEEE") 802.11 (WiFi) or other wireless protocols. It will be understood that link 176 also includes any base stations and backhaul links necessary to connect mobile electronic device 104 to network 172. Links 180 and 184 can be backhaul links between network 172 and, respectively, web server 140 and DNS server 156. In light of the above, it will be understood that communications interfaces 116, 152 and 168 can therefore be selected for compatibility with links 176, 180 and 184 as well as with network 172.

In general, web server 140 is configured to host web pages such as a web page 188 maintained in memory 148. Web server 140 thus includes a web hosting application 190, comprising computer readable instructions maintained in memory 148 for execution by processor 144. Processor 144 is configured, via execution of web hosting application 190, to host web page 188 as discussed below. Web server 140 can transmit web page 188 to computing devices such as mobile electronic device 104 in response to requests for web page 188 received from such devices. Mobile electronic device includes a web browser application 192 comprising computer readable instructions maintained in memory 112, for execution by processor 108. Processor 108 can be configured, via execution of web browser application 192, to request web page 188 from web server 140 and to render web page 188 on display 120 once received.

As will be understood by those skilled in the art, web server 140 can be identified by a name, such as "www.webserver140.com," as well as by a network address. The network address, which can be an Internet Protocol ("IP") address such as 1.1.1.1, allows other computing devices to address requests for web page 188 to web server 140. It will be understood that web server 140 can represent a plurality of web servers, all of which are identifiable to mobile electronic device 104 by the same network address. A router, load balancer or the like can be responsible for distributing requests among the plurality of web servers. DNS server 156 maintains in memory 164 a list 194 of web server names and corresponding network addresses, as will be discussed below in greater detail. In order to request web page 188 from web server 140, mobile electronic device 104 can transmit a request to DNS server 156, the request including the name www.webserver140.com. DNS server 156 can then retrieve the corresponding network address 1.1.1.1 from list 194 and return the retrieved network address to mobile electronic device 104. Mobile electronic device 104 can then transmit a further request, using the network address, to web server 140 for web page 188.

Web page 188 can contain one or more references to foreign elements—that is, elements such as text, images and the like which are not stored in memory 148 of web server 140 but rather in the memory of other web servers (not shown) identified by other network addresses. Such other web servers can also be pluralities of web servers identifiable by a single network address. A reference to a foreign element can include the name of the other web server at which the element is hosted. In the present exemplary embodiment, web page 188 contains two references to foreign elements. Each reference includes the name of the web server where the foreign element is stored. For example, the first reference can be, "www.webserverx.com/image_star.jpg," referring to an image file maintained in the memory of a second web server identified by the name www.webserverx.com. The second reference can be "web.server.yyy/image_ring.png," referring to an image file maintained in the memory of a third web server identified by the name web.server.yyy. It will also be apparent that any given web page can contain less or more references to foreign elements than web page 188, and that those foreign elements are not restricted solely to images. For example, foreign elements can be references to other web pages.

Figure 2:
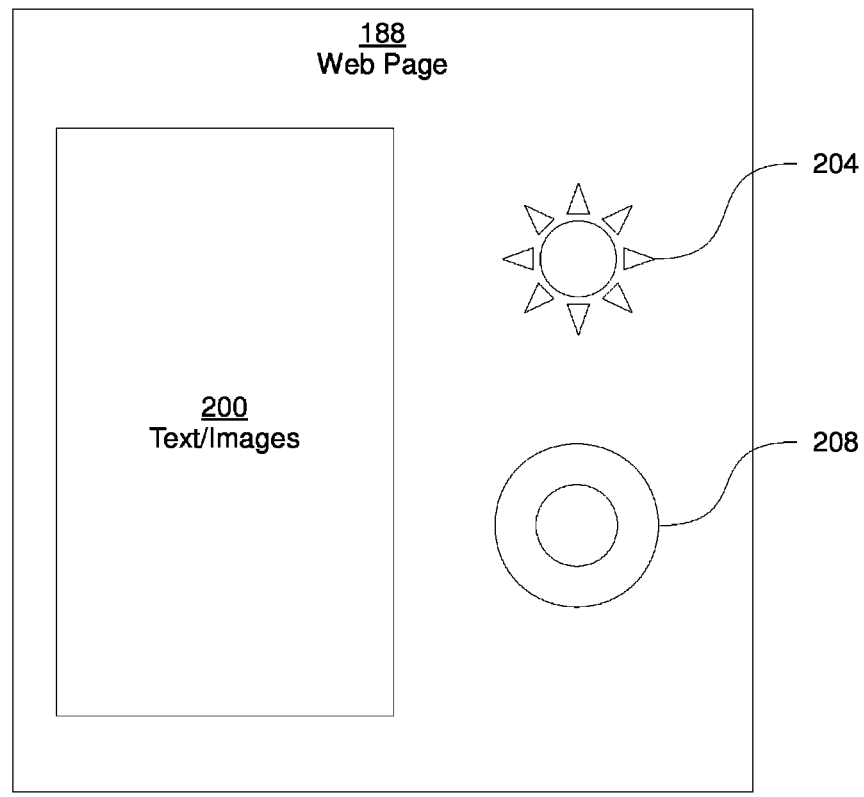
FIG. 2 depicts a web page of the system of FIG. 1, according to a non-limiting embodiment.

Thus, as will be appreciated by those skilled in the art, in order to fully obtain web page 188 for display at mobile electronic device 104, web page 188 is typically requested from web server 140, and each foreign element is then requested from the other web server on which it is stored. FIG. 2 depicts a schematic representation of web page 188 as rendered on display 120 of mobile electronic device 104. Web page 188 can include text and images generally indicated at 200 that are maintained within memory 148 of web server 140. Also seen in FIG. 2 are foreign elements 204 and 208, which correspond to the above-mentioned references contained within web page 188. In particular, foreign element 204 corresponds to the reference to image_star.jpg which is maintained at the second web server named www.webserverx.com. Foreign element 208 corresponds to the reference to image_ring.png which is maintained at the third web server named web.server.yyy.

Figure 3:
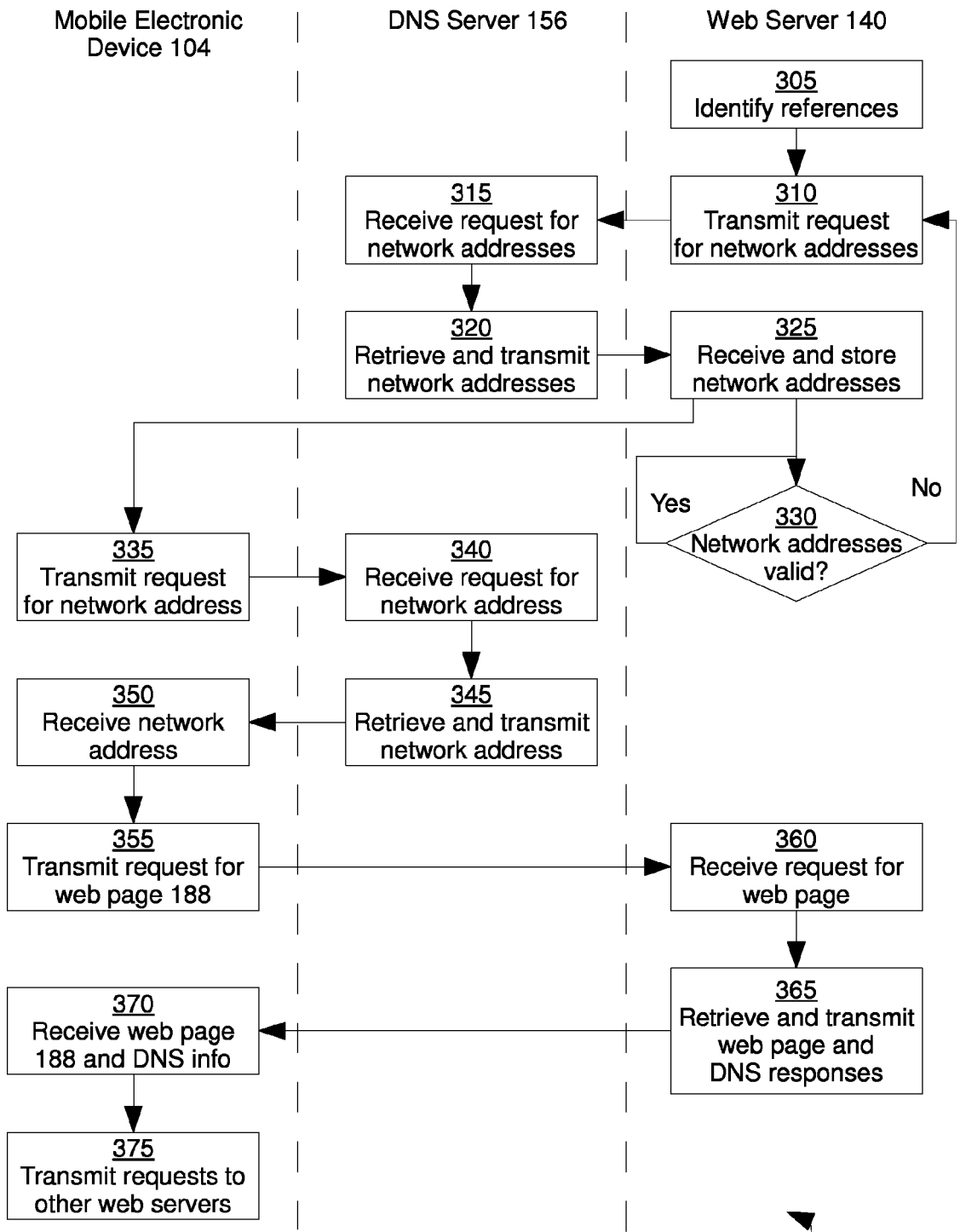
FIG. 3 depicts a method for delivering web content, according to another non-limiting embodiment.

Referring now to FIG. 3, a method 300 for delivering web content will be discussed in conjunction with system 100. Each block shown in FIG. 3 is performed by the component of system 100 under which it is listed. For example, the blocks of method 300 falling along the right side of FIG. 3 are performed by web server 140.

Method 300 begins at block 305, at which processor 144 of web server 140 is configured via execution of web hosting application 190 to traverse web page 188 as stored in memory 148 and identify any references to foreign elements therein. Continuing with the exemplary web page 188 discussed above, processor 144 of web server 140 can therefore be configured to identify, at block 305, the references www.webserverx.com/image_star.jpg and web.serveryyy/image_ring.png.

Proceeding to block 310, having identified the above-mentioned references to foreign elements, processor 144 can be configured to transmit, via interface 152, one or more requests to DNS server 156 for the network addresses corresponding to the names included in the references identified at block 305. It will be understood by those skilled in the art that web server 140 can transmit one request per reference or alternatively can transmit one request for all references identified. Other arrangements for requesting network addresses from DNS server 156 may also occur to those skilled in the art. Solely for the sake of convenience in describing method 300, in the present exemplary embodiment web server 140 will transmit one request for all identified references. At block 310, therefore, processor 144 is configured to transmit a request to DNS server 156 via interface 152. The request includes the names of the second and third web servers hosting foreign elements 204 and 208, www.webserverx.com and web.server.yyy.

At block 315, the request is received at DNS server 156 via interface 168, having traversed link 180, network 172 and link 184. Once the request is received at block 315, method 300 proceeds to block 320. At block 320, processor 160 of DNS server 156 can be configured to search list 194 for network addresses corresponding to the names included in the request from web server 140. In the present exemplary embodiment, list 194 includes the entries shown in Table 1.

TABLE 1

Contents of List 194

| Name | Network Address |
| --- | --- |
| www.webserver140.com | 1.1.1.1 |
| www.webserverx.com | 1.2.3.4 |
| web.server.yyy | 2.2.2.2 |

In completing the performance of block 320, processor 160 of DNS server 156 can be configured to transmit, via interface 168, the retrieved network addresses to web server 140. Thus, at block 320 DNS server 156 transmits network addresses 1.2.3.4 and 2.2.2.2, corresponding to the names included in the references to foreign elements located at block 305.

At block 325, processor 144 of web server 140 is configured, via execution of web hosting application 190, to receive the network addresses transmitted by DNS server 156 and store the received network addresses in memory 148. In particular, referring briefly to FIG. 1, web server 140 includes a database 196 in memory 148. Database 196 can contain a record for each web page hosted by web server 140. Each record of database 196 includes an identification of the web page, as well as a name-value pair for each reference to a foreign element included in the web page. The name-value pair can comprise the name and corresponding network address of the other web server at which the foreign element is hosted. In the present exemplary embodiment, therefore, database 196 includes a record for web page 188. Following the performance of block 325, the record can appear as shown in Table 2.

TABLE 2

Contents of Database 196

| Web Page | Foreign Element 204 | Foreign Element 208 |
| --- | --- | --- |
| www.webserver140.com/webpage188.html | {www.webserverx.com, 1.2.3.4} | {web.server.yyy, 2.2.2.2} |

The first entry, www.webserver140.com/webpage188.html, identifies web page 188 as a particular file on web server 140. That is, "webpage188.html" is an identifier for web page 188. The second entry includes the name and network address for the second web server hosting foreign element 204. The final entry includes the name and network address for the third web server hosting foreign element 208. It will be understood that for web pages with additional foreign elements, additional entries could be made in database 196. For instance, if web page 188 included four references to foreign elements, the above record would include two additional entries.

Method 300 can then proceed to block 330. At block 330, processor 144 can be configured to determine whether the network addresses received at block 325 remain valid. As will be appreciated by those skilled in the art, the network addresses of the second and third web servers can be subject to change over time. The determination at block 330 can therefore be based on a timestamp associated with each network address. The timestamps can be received from DNS server 156 at block 325. If the current time, available to processor 144 of web server 140 via a clock (not shown) included within web server 140, exceeds any timestamp by a configurable interval (for example, three days) processor 144 can determine that the network address associated with that timestamp is no longer valid. Method 300 can then return to block 310. If, on the other hand, processor 144 determines at block 330 that the network addresses are valid, method 300 can repeat the performance of block 330. As will now be apparent to those skilled in the art, block 330 need not be performed in every performance of method 300. For example, block 330 can be performed only at scheduled, configurable intervals of time (for example, once per day).

Method 300 continues (whether or not block 330 is performed) at block 335. At block 335, processor 108 of mobile electronic device 104 can be configured, via execution of web browser application 192, to transmit a request for the network address of web server 140. Performance of block 335 can be initiated by the receipt of input data at keypad 128 (or any other input device of mobile electronic device 104) requesting that mobile electronic device 104 retrieve and display web page 188. The request transmitted at block 335 thus includes the name of web server 140, www.webserver140.com.

At block 340, DNS server 156 receives the request from mobile electronic device 104. Proceeding to block 345, DNS server 156 can be configured to retrieve the network address of web server 140 as shown above in Table 1 and transmit the network address to mobile electronic device 104. Processor 108 of mobile electronic device 104 receives the network address of web server 140 via interface 116 at block 350. Proceeding to block 355, processor 108 can be configured to transmit a request for web page 188 to web server 140, using the network address obtained at block 350 to contact web server 140. The request transmitted at block 355 can be a Hypertext Transfer Protocol ("HTTP") request including, for example, the name of web server 140 and the above-mentioned identifier for web page 188: www.webserver140.com/webpage188.html.

Continuing with the performance of method 300, at block 360 processor 144 of web server 140 receives, via interface 152, the request for web page 188. At block 365, processor 144 can be configured via execution of web hosting application 190 to retrieve both web page 188 and the DNS responses for web page 188 received at block 325 and stored in database 196. Processor 144 can be configured to then transmit web page 188 and the retrieved DNS responses for web page 188 to mobile electronic device 104. The transmission of DNS responses at block 365 can take place in the form of an HTTP response header with the following exemplary format:

HTTP-DNS-Results: {www.webserverx.com, 1.2.3.4}, {web.server.yyy, 2.2.2.2}

Following receipt (and storage in memory 112) of web page 188 and DNS responses at block 370, processor 108 of mobile electronic device 104 can then be configured to transmit requests for foreign elements 204 and 208 directly to the second and third web servers (not shown) where foreign elements 204 and 208 are hosted at block 375. As will now be apparent to those skilled in the art, mobile electronic device 104 can be configured to display web page 188 as in FIG. 2 once foreign elements 204 and 208 have been received from the second and third web servers.

From the above description of the present embodiment, certain advantages will now be apparent. For example, as a result of receiving network addresses for the web servers hosting foreign elements in a web page along with the web page itself, mobile electronic device 104 is no longer required to transmit additional requests to DNS server 156 to determine the network addresses of those other web servers. Thus, mobile electronic device 104 makes more efficient use of the network bandwidth available to it, and computational and memory resources are released that otherwise would have been consumed sending DNS requests and waiting for responses to those requests. Instead, additional DNS requests are offloaded to web server 140, which will generally far surpass mobile electronic device 104 in terms of available bandwidth, memory and computational power. The performance of mobile electronic device 104 executing web browser application 192 is thus increased. Other advantages will also occur to those skilled in the art. As a further example, DNS requests can be made over User Datagram Protocol ("UDP") or other similar protocols which lack reliable transmission mechanisms. Thus, if a DNS request is lost (due to network or transmission failures) it is simply re-sent after a certain period of time elapses without response. This waiting and retransmission would be costly to mobile electronic device 104, but can be offloaded to web server 140 by the performance of method 300.

Figure 4:
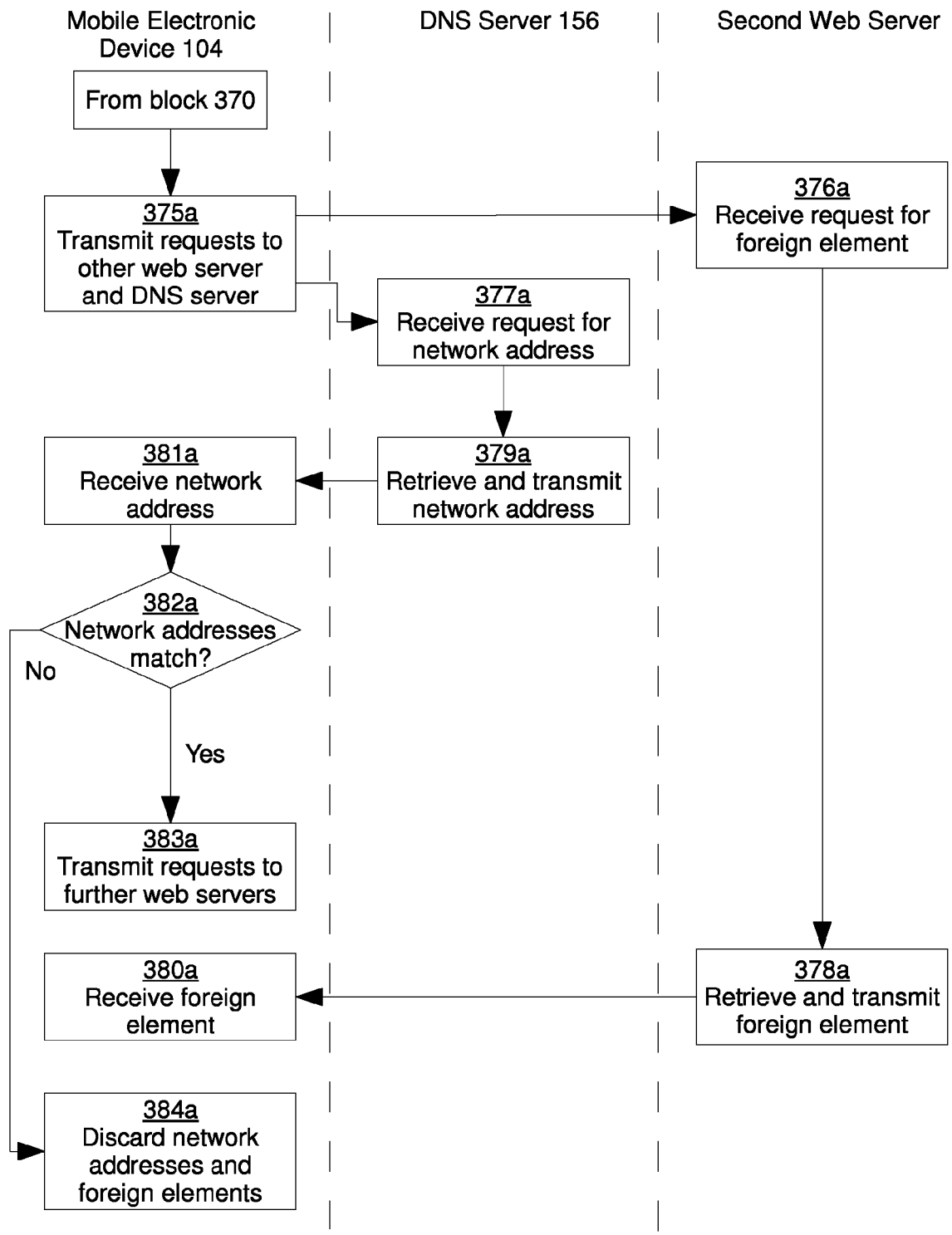
FIG. 4 depicts a method for delivering web content, according to a further non-limiting embodiment.

As will be appreciated by those skilled in the art, variations can be made to method 300. In some embodiments, method 300 can be varied as shown in FIG. 4, which depicts a continuation of method 300. Beginning following the performance of block 370 as discussed above in connection with FIG. 3, mobile electronic device can proceed to block 375a rather than block 375. At block 375a, processor 108 can be configured, via execution of browser application 192, to transmit two requests relating to a given foreign element. Processor 108 can thus be configured to transmit, via interface 116, a request for foreign element 204 to the second web server using the network address (1.2.3.4) obtained at block 370. Processor 108 can also be configured to transmit, substantially simultaneously, a request to DNS server 156 for the network address corresponding to the name of the second web server (www.webserverx.com).

At blocks 376a and 377a, respectively, the second web server and DNS server 156 receive the requests from mobile electronic device 104. At blocks 378a and 379a, the second web server returns foreign element 204 while DNS server 156 returns the network address corresponding to www.webserverx.com. Processor 108 of mobile electronic device 104 can be configured to receive, at blocks 380a and 381a, foreign element 204 and the second network address corresponding to www.webserverx.com (the first having been received at block 370).

At block 382a, processor 108 of mobile electronic device 104 can be configured to determine whether the network address received at block 381a matches the network address corresponding to www.webserverx.com received at block 370. If the determination at block 382a is affirmative—that is, if both web server 140 and DNS server 156 have provided mobile electronic device 104 with the same network address for the second web server—processor 108 can be configured to perform block 383a, at which a request for foreign element 208 can be transmitted to the third web server. Note that the request for foreign element 208 can also be transmitted to the third web server as part of the performance of block 375a, in which case the performance of block 383a would not be necessary. In such a variation, following an affirmative determination at block 382a processor 108 can be configured to simply proceed with the displaying of web page 188.

A negative determination at block 382a, where the network address received from DNS server 156 is not 1.2.3.4 (the network address corresponding to www.webserverx.com received from web server 140 at block 370), can indicate that web server 140 has been compromised or is part of an attempt to misdirect mobile electronic device 104. Such a mismatch can also indicate that the foreign element received at block 380a is not in fact foreign element 204. Processor 108 of mobile electronic device can thus be configured to perform block 384a. At block 384a, processor 108 can be configured to discard any foreign elements received at block 380a, as they may be illegitimate. Processor 108 can also be configured to discard all network addresses received at block 370. Processor 108 can also be configured to store an indication in memory 112 that future DNS responses from web server 140 are to be ignored, either permanently or for a configurable period of time. Following the performance of block 384a, processor 108 can be configured to obtain network addresses corresponding to the www.webserverx.com and web.server.yyy directly from DNS server 156.

As will be appreciated by those skilled in the art, further variations can be made to the above-described embodiments.

Figure 5:
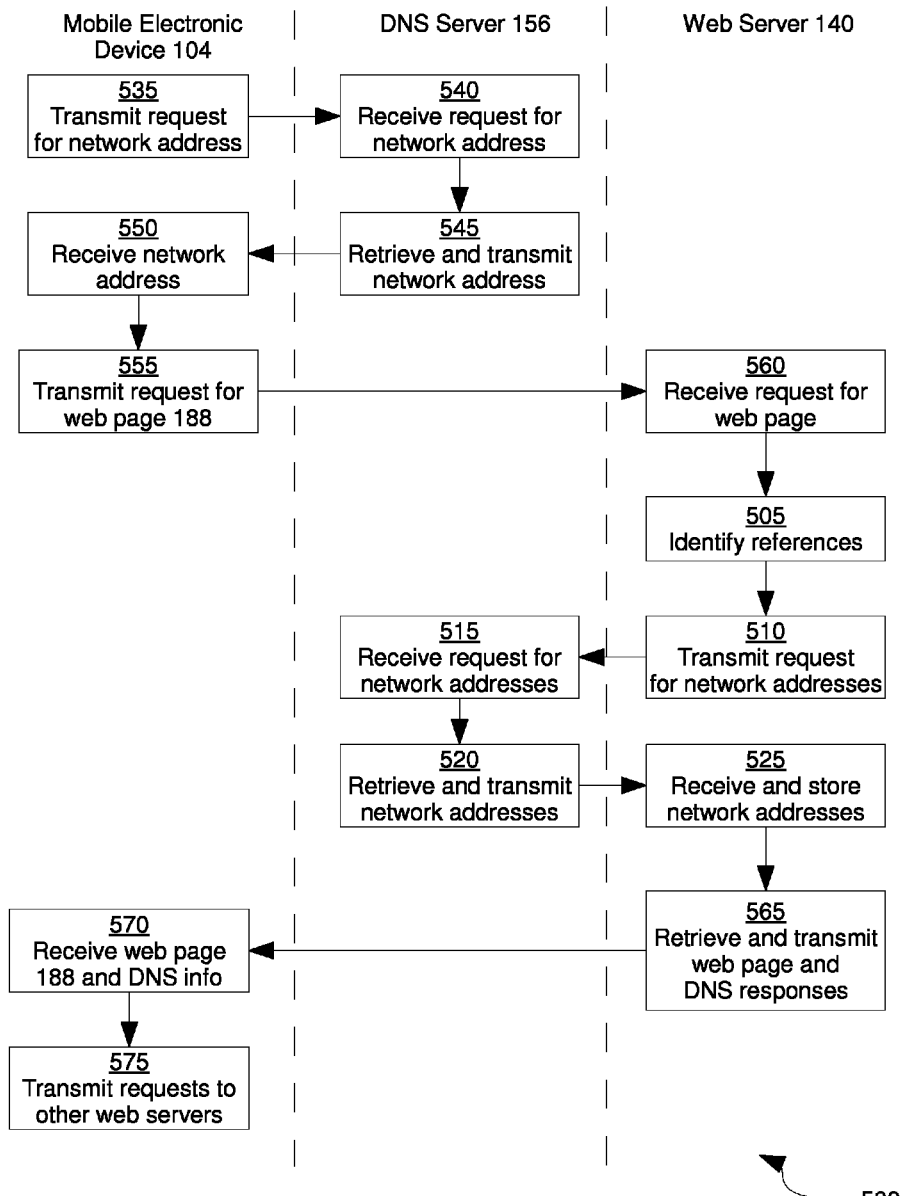
FIG. 5 depicts a method for delivering web content, according to yet another non-limiting embodiment.

For example, method 300 need not include a determination at block 330. Instead, in some embodiments web server 140 can be configured to request network addresses at scheduled, configurable intervals (for example, once per day) regardless of the validity of the network addresses in database 196. In some embodiments, as shown in FIG. 5, web server 140 can be configured to request network addresses only after receiving a request for web page 188 from mobile electronic device 104. The blocks of method 500 depicted in FIG. 5 are numbered similarly to those of method 300, with the exception of the leading '5' used in method 500. That is, blocks 535, 540, 545, 550, 555, 560, 505, 510, 515, 520, 525, 565, 570 and 575 correspond respectively to blocks 335, 340, 345, 350, 355, 360, 305, 310, 315, 320, 325, 365, 370 and 375 of method 300. Note that method 500 does not include an equivalent to block 330, and that the blocks of method 500 are rearranged compared to those of method 300. In the performance of method 500, web server 140 identifies references to foreign elements 204 and 208 and requests network addresses for those elements in response to receiving a request for web page 188.

In some embodiments, performances of methods 300 and 500 can include, at blocks 355 and 555, the transmission of a header or other flag with the request transmitted by mobile electronic device 104. The header can indicate that mobile electronic device 104 is capable of receiving DNS responses as discussed above along with the requested web page. In such embodiments, web server 140 can determine, at blocks 360 and 560, whether or not to transmit the DNS responses. If the header received from mobile electronic device 104 indicates support for receipt of DNS responses, web server 140 can proceed to blocks 365 and 565 as described above. Otherwise, web server 140 can simply return the requested web page, without DNS responses.

Additionally, in some embodiments mobile electronic device 104 can be configured to associate DNS responses received at blocks 370 and 570 with web page 188. For instance, the DNS responses can be stored in memory 112 along with a flag or other indication that the DNS responses were received in connection with web page 188 and are not to be used in obtaining any other web page. As will now be apparent to those skilled in the art, association of received DNS responses with a particular web page can prevent a malicious entity from polluting memory 112 with false DNS responses in an effort to misdirect mobile electronic device 104 in future web page requests.

It will be understood that the methods, systems and apparatus described herein need not be limited to web browsing. For example, email and instant messaging applications executing on messaging servers and mobile electronic devices can also perform the methods described above. For example, an instant message can be transmitted from a mobile electronic device, with a specified destination (such as another mobile electronic device). The instant message can contain a reference to a web page, such as www.webserverx-.com/webpage.html. A messaging server responsible for routing the instant message to the destination can be configured to obtain a network address from DNS server 156 corresponding to www.webserverx.com and to transmit the network address to the destination along with the message itself. As a result, it will not be necessary for the destination to request a network address prior to obtaining the web page. It will now be apparent that such variations can substantially follow the blocks of FIG. 5. That is, an instant message can be transmitted from mobile electronic device 104 (555). A messaging server can receive the instant message (560) and identify a reference to a web page therein (505). The messaging server can then request (510) a network address corresponding to the name of the web server included in the instant message reference. Having obtained the network address (525) the messaging server can forward the instant message to the appropriate destination along with the DNS response (565). It will also be apparent that the requests and responses described herein need not be limited to HTTP requests and responses, and that a wide variety of other suitable protocols will occur to those skilled in the art.

Those skilled in the art will appreciate that in some embodiments, the functionality of web browser application 192 executing on processor 108 and that of web hosting application 190 executing on processor 144 can be implemented using pre-programmed hardware or firmware elements (e.g., application specific integrated circuits (ASICs), electrically erasable programmable read-only memories (EEPROMs), etc.), or other related components. In other embodiments, web browser application 192 and web hosting application 190 can be maintained on computer readable storage media other than memories 112 and 148. Exemplary computer readable storage media include fixed, tangible storage media readable directly by processors 108 and 144 (e.g., removable diskette, CD-ROM, ROM, fixed disk, USB drive). Other exemplary computer readable storage media include remote storage from which computer readable instructions are transmittable to processors 108 and 144.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

I claim:

1. A method in a web server having a memory and a communications interface, comprising:
    maintaining a web page in the memory, the web page including a reference to a foreign element maintained at a second web server identifiable by a second network address, the reference including a name of the second web server;
    receiving a request for the web page at the communications interface;
    identifying the reference;
    transmitting an address request for obtaining the second network address;
    receiving an address response including the second network address at the communications interface;
    storing the second network address in the memory in association with an identifier of the web page; and
    in response to the request for the web page, sending the address response, including the second network address and the name of the second web server, and the web page including the reference comprising the name of the second web server.

2. The method of claim 1, wherein receiving the request for the web page comprises receiving the request from a mobile electronic device; and
    wherein the web page and the address response are sent to the mobile electronic device.

3. The method of claim 1, comprising identifying the reference in response to receiving the request for the web page.

4. The method of claim 1, comprising identifying the reference prior to receiving the request for the web page, and sending the address response and the web page in response to receiving the request for the web page.

5. The method of claim 1, wherein the request for the web page includes an indication of whether an originator of the request can receive the address response; and
   wherein the sending comprises:
   when the indication is negative, sending the web page without the address response.

6. The method of claim 1, further comprising:
   determining if the second network address included in the address response is valid; and,
   when the determination is negative, transmitting a further address request for the second network address.

7. The method of claim 5, wherein determining if the second network address of the second web server is valid comprises comparing a current time to a timestamp associated with the second network address.

8. A web server, comprising:
   a communications interface;
   a memory maintaining a web page including a reference to a foreign element maintained at a second web server identifiable by a second network address, the reference including a name of the second web server; and
   a processor interconnected with the communications interface and the memory;
   the processor configured to receive a request for the web page via the communications interface;
   the processor further configured to identify the reference;
   the processor further configured to transmit an address request via the communications interface for obtaining the second network address;
   the processor further configured to receive an address response including the second network address via the communications interface;
   the processor further configured to store the second network address in the memory in association with an identifier of the web page; and
   the processor further configured, in response to the request for the web page, to send the address response, including the second network address and the name of the second web server, and the web page including the reference comprising the name of the second web server.

9. The web server of claim 8, the processor configured to receive the request for the web page from a mobile electronic device; and to send the address response and the web page to the mobile electronic device.

10. The web server of claim 8, the processor configured to identify the reference in response to receiving the request for the web page.

11. The web server of claim 8, the processor configured to identify the reference prior to receiving the request for the web page, and to send the address response and the web page in response to receiving the request for the web page.

12. The web server of claim 8, wherein the request for the web page includes an indication of whether an originator of the request can receive the address response; the processor configured to send the web page without the address response when the indication is negative.

13. The web server of claim 8, the processor further configured:
   to determine if the second network address included in the address response is valid; and, when the determination is negative, to transmit a further address request for the second network address.

14. The web server of claim 13, the processor configured to determine if the second network address of the second web server is valid by comparing a current time to a timestamp associated with the second network address.

15. A non-transitory computer readable medium storing computer readable instructions executable by a processor for implementing a method in a web server having a memory and a communications interface, comprising:
   maintaining a web page in the memory, the web page including a reference to a foreign element maintained at a second web server identifiable by a second network address, the reference including a name of the second web server;
   receiving a request for the web page at the communications interface;
   identifying the reference;
   transmitting an address request for obtaining the second network address;
   receiving an address response including the second network address at the communications interface;
   storing the second network address in the memory in association with an identifier of the web page; and
   in response to the request for the web page, sending the address response, including the second network address and the name of the second web server, and the web page including the reference comprising the name of the second web server.

16. The non-transitory computer readable medium of claim 15, wherein receiving the request for the web page comprises receiving the request from a mobile electronic device; and
   wherein the web page and the address response are sent to the mobile electronic device.

17. The non-transitory computer readable medium of claim 15, the method comprising identifying the reference in response to receiving the request for the web page.

18. The non-transitory computer readable medium of claim 15, the method comprising identifying the reference prior to receiving the request for the web page, and sending the address response and the web page in response to receiving the request for the web page.

19. The non-transitory computer readable medium of claim 15, wherein the request for the web page includes an indication of whether an originator of the request can receive the address response; and
   wherein the sending comprises:
   when the indication is negative, sending the web page without the address response.

20. The non-transitory computer readable medium of claim 15, the method further comprising:
   determining if the second network address included in the address response is valid by comparing a current time to a timestamp associated with the second network address; and,
   when the determination is negative, transmitting a further address request for the second network address.

* * * * *